United States Patent
Kadowaki et al.

(10) Patent No.: US 10,302,166 B2
(45) Date of Patent: May 28, 2019

(54) VIBRATION ISOLATING DEVICE

(71) Applicants: YAMASHITA RUBBER KABUSHIKI KAISHA, Fujimino-shi, Saitama (JP); HONDA MOTOR CO., LTD., Tokyo (JP)

(72) Inventors: Hirokazu Kadowaki, Fujimino (JP); Shinji Yamashita, Wako (JP)

(73) Assignees: YAMASHITA RUBBER KABUSHIKI KAISHA, Fujimino-Shi (JP); HONDA MOTOR CO., LTD., Tokyo (JP)

( * ) Notice: Subject to any disclaimer, the term of this patent is extended or adjusted under 35 U.S.C. 154(b) by 46 days.

(21) Appl. No.: 15/514,940

(22) PCT Filed: Sep. 18, 2015

(86) PCT No.: PCT/JP2015/076788
§ 371 (c)(1),
(2) Date: Mar. 28, 2017

(87) PCT Pub. No.: WO2016/052278
PCT Pub. Date: Apr. 7, 2016

(65) Prior Publication Data
US 2017/0211648 A1    Jul. 27, 2017

(30) Foreign Application Priority Data
Sep. 30, 2014 (JP) ................................ 2014-202582

(51) Int. Cl.
*F16F 1/387* (2006.01)
*F16F 1/36* (2006.01)
(Continued)

(52) U.S. Cl.
CPC ............ *F16F 1/387* (2013.01); *B60K 5/1216* (2013.01); *F16F 1/36* (2013.01); *F16F 1/3849* (2013.01); *F16F 1/3863* (2013.01); *B60K 5/1208* (2013.01)

(58) Field of Classification Search
CPC ........ F16F 1/387; F16F 1/3849; F16F 1/3863; F16F 1/36; B60K 5/1216; B60K 5/1208
See application file for complete search history.

(56) References Cited

U.S. PATENT DOCUMENTS

2011/0042871 A1*  2/2011  Ohashi ................. B60K 5/1208
                                                      267/140.13

FOREIGN PATENT DOCUMENTS

| JP | 11-270624 | 10/1999 |
| JP | 2005-282732 | 10/2005 |

(Continued)

OTHER PUBLICATIONS

International Search Report, dated Dec. 22, 2015 (Dec. 22, 2015).

*Primary Examiner* — Melanie Torres Williams
(74) *Attorney, Agent, or Firm* — Rankin, Hill & Clark LLP

(57) ABSTRACT

A bracket has a cylindrical part which opens in the Y direction. An inner member is arranged within the cylindrical part and faces in the Y direction. An elastic body connects the inner member and the cylindrical part and includes a pair of X direction elastic parts, a projecting part, and a Y-direction elastic part. The X direction elastic parts connect the inner member and the cylindrical part in an X direction. The projecting part is provided in an end in the Y direction of the cylindrical part. The Y direction elastic part is connected to a Y direction supporting part of a bottom wall. The projecting part partially overlaps with the Y direction supporting part of the inner member in the Y direction. No part projects outwardly of the cylindrical part (Continued)

and interferes with the vehicle body or surrounding members, increasing a degree of freedom in layout.

19 Claims, 12 Drawing Sheets

(51) Int. Cl.
*B60K 5/12* (2006.01)
*F16F 1/38* (2006.01)

(56) References Cited

FOREIGN PATENT DOCUMENTS

| | | | | |
|---|---|---|---|---|
| JP | 3723633 | 12/2005 | | |
| JP | 2006-097741 | 4/2006 | | |
| JP | 2009-047207 | 3/2009 | | |
| WO | WO-2016052062 A1 * | 4/2016 | ............... | B60K 5/12 |

\* cited by examiner

VIBRATION ISOLATING DEVICE

TECHNICAL FIELD

The present invention relates to a vibration isolating device for use in an engine mount for a motor vehicle or the like, for example.

BACKGROUND ART

There is known the device that comprises an outer member of cylindrical shape, an inner member of cylindrical shape arranged inside the outer member, and an elastic member connecting these outer and inner cylindrical members, wherein a spring constant in the axial direction of the inner member is heightened (see a patent reference 1).

FIG. 12 is a cross sectional view schematically showing an engine mount (a vibration isolating device) disclosed in the above patent reference 1. This engine mount has an inner member 130 which is concentrically arranged inside of a cylindrical member 112 provided in an outer member and an elastic member 120 which provides a connection between the outer member 112 and the inner member 130. The inner member 130 of a shaft shaped member is carried in an axially movable manner with respect to the outer member 112 (in the following description, the axial direction of the inner member 130 shall be referred to as a Y direction).

Further, a downwardly projecting inner member side projection 133 is provided in an end portion in the Y direction of the inner member 130. A projection 115 which projects downwardly in the drawing is provided on an opening side located on an end of the cylindrical member 112 so as to be opposed to the inner member side projection 133. The inner member side projection 133 and the projection 115 are connected to each other by a Y direction elastic part 124 which is a continuous portion of the elastic body 120. The Y direction elastic part 124 is a part to be elastically deformed mainly by movement in the Y direction of the inner member 130.

This engine mount supports an engine in a vibration isolating manner by mounting the outer member 112 on a vehicle body 142 and mounting the inner member 130 on the engine (not shown).

In addition, when the inner member 130 is moved to the left side in the Y direction of the drawing due to a vibration of the engine, the Y direction elastic part 124 is compressed and deformed between the inner member side projection 133 and the projection 115. Therefore, the spring constant in the Y direction of the elastic body 120 becomes higher.

PRIOR ART REFERENCE

Patent reference 1: Japanese Patent Application Laid-Open Publication No. 2005-282732.

DISCLOSURE OF THE INVENTION

Problem to be Solved by the Invention

According to the prior art example, the spring constant in the Y direction of the elastic body 120 can be heightened. However, since the inner member side projection 133 and the projection 115 project downwardly in the drawing respectively, the projection 115 must be considered so as not to interfere with the vehicle body 142 when the outer member 112 is mounted on the vehicle body 142, whereby there is a possibility that layout at the time of being mounted on the vehicle body side is largely restricted.

Moreover, since there is the inner member side projection 133, the inner member side projection 133 must be laid out so as not to interfere with surrounding members. In addition, the inner member side projection 133 must be considered so as not to interfere with the surrounding members at the time of large displacement in the Y direction when the inner member 130 is moved excessively in the Y direction. Therefore, there is a possibility of causing restrictions on the layout with respect to the surrounding members.

Further, since the relatively large inner member side projection 133 is provided in the inner member 130 which is connected to the engine as a vibration generating part, the weight of the inner member 130 is increased and so a vibration characteristic value of an engine bracket which provides a connection between the engine and the inner member 130 is reduced. It is therefore an object of the present invention to solve the above referred problems.

Means for Solving the Problem

In order to achieve the above object, a vibration isolating device according to a first feature of the present invention comprises a bracket (10) having a cylindrical part (12) and being mounted on a vibration receiving part side, an inner member (30) being arranged in the cylindrical part (12) and mounted on a vibration generating part side, and an elastic body (20) providing an elastic connection between the inner member (30) and the cylindrical part (12), wherein letting orthogonal triaxial directions be X, Y and Z, Z being an inputting direction of a static load, and X and Y being two directions intersecting at right angles to each other within a plane orthogonal to the inputting direction of the static load, the elastic body (20) has an X direction elastic part (22) which functions as a main body at the time of receiving a vibration in the X direction, and a Y direction elastic part (24) which functions as a main body at the time of receiving a vibration in the Y direction, wherein the cylindrical part (12) is provided with a front side opening (12e) formed by opening one end in the Y direction thereof and a projecting part (15) projecting in the Z direction at a back side end portion (12f) of the other end thereof and being arranged so as to be spaced apart on the outside in the Y direction with respect to the inner member (30) within the cylindrical part (12), and the inner member (30) is provided with a Y direction supporting part (33) which is located within the cylindrical part (12) so as to be opposed in a spaced relationship on the inside in the Y direction with respect to the projecting part (15), and wherein the projecting part (15) and the Y direction supporting part (33) are connected within the cylindrical part (12) by the Y direction elastic part (24), and the Y direction supporting part (33) overlaps with at least a portion of the projecting part (15) in the Y direction.

According to a second feature of the present invention, in addition to the first feature, the inner member (30) is provided in a portion of a surface thereof with an X direction supporting part (34) which extends in the Y direction to thereby be connected to the X direction supporting part (22), and a portion of the X direction supporting part (34) overlaps with at least a portion of the projecting part (15) in the Y direction.

According to a third feature of the present invention, in addition to the first or second feature, a portion of the projecting part (15) to which the Y direction elastic part (24) is connected is formed into an inclined surface (15a), and the inclined surface (15a) and the Y direction supporting part (33) are connected obliquely by the Y direction elastic part (24).

According to a fourth feature of the present invention, in addition to any one of the first to third features, at least a portion of the Y direction supporting part (33) is formed into an inclined surface (31a).

According to a fifth feature of the present invention, in addition to any one of the first to fourth features, an intermediate member (70) made of a rigid material is integrally combined with an intermediate portion of the Y direction elastic part (24) located between the Y direction supporting part (33) and the projecting part (15).

According to a sixth feature of the present invention, in addition to any one of the first to fifth features, the inner member (30) is formed of a cylindrical member.

According to a seventh feature of the present invention, in addition to any one of the first to fifth features, a member (60) to be connected to the vibration generating part is placed on the inner member (50) and joined together by a fastening member (64) which is inserted from a concave part (12d) formed in the cylindrical part (12), and the inner member (50) has a fastening portion (52) which allows the fastening member (64) to be connected thereto, wherein the fastening portion (52) faces the concave part (12d) and is arranged in a position offset toward the front side opening (12e).

According to an eighth feature of the present invention, in addition to any one of the first to seventh features, the inner member (30) is supported by the Y direction elastic part (24) in a cantilever manner, and the Y direction elastic part (24) is larger in thickness than the X direction elastic part (22).

Effects of the Invention

According to the first feature of the present invention, the projecting part (15) which projects in the Z direction is provided at the other end (12f) in the Y direction of the cylindrical part (12). This projecting part (15) and the Y direction supporting part (33) of the inner member (30) are connected within the cylindrical part (12) by the Y direction elastic part (24), and the Y direction supporting part (33) is configured to overlap partially with the projecting part (15) in the Y direction. With this construction, when the inner member (30) is moved in the Y direction, the Y direction elastic part (24) can be elastically deformed between the Y direction supporting part (33) and the projecting part (15). Therefore, a spring constant of the Y direction elastic part (24) can be heightened in the Y direction.

Moreover, the Y direction elastic part (24), the projecting part (15) and the Y direction supporting part (33) which support the Y direction elastic part (24) are arranged in an interior of the cylindrical part (12), so that the Y direction supporting part (33) of the inner member (30) which faces the projecting part (15) is configured not to project outwardly of the cylindrical part (12). Therefore, when mounting the cylindrical part (12) on the vibration receiving part (42) side, the projecting part (15) and the Y direction supporting part (33) do not interfere with the vibration receiving part (42) side. Thus, the degree of freedom in layout with respect to the vibration receiving part (42) can be increased.

Further, since the Y direction supporting part (33) is provided on an end surface in the Y direction of the inner member (30), there is no need for providing a relatively large projecting part which projects from the inner member (30) to the outside of the cylindrical part (12).

Therefore, there is no possibility that the above relatively large projecting part interferes with the surrounding members. Moreover, also at the time of excessive displacement in the Y direction of the inner member (30), there is no possibility of interfering with the surrounding members. Accordingly, the degree of freedom in layout with respect to the surrounding members is increased.

In addition, since the increase in weight of the inner member (30) can be prevented, it is possible to decrease the characteristic value of a connecting member (40) which provides a connection between the inner member (30) and the vibration generating part.

According to the second feature of the present invention, the X direction supporting part (34) for supporting the X direction elastic part (22) is provided on the surface of the inner member (30). This X direction supporting part (34) is configured to overlap with at least a portion of the projecting part (15) in the Y direction. Therefore, at the time of the displacement in the Y direction of the inner member (30) to be moved to approach the projecting part (15), a portion of the X direction elastic part (22) can be elastically deformed between the X direction supporting part (34) and the projecting part (15). Accordingly, the spring constant in the Y direction of the elastic body (20) can be more heightened.

According to the third feature of the present invention, a portion of the projecting part (15) which is connected to the Y direction elastic part (24) is formed into the inclined surface (15a). Therefore, in the case where the Y direction elastic part (24) connects obliquely the projecting part (15) and the Y direction supporting part (33), the spring constant can be heightened when the compressed Y direction elastic part (24) is configured to receive the inclined surface (15a) substantially in the perpendicular direction.

According to the fourth feature of the present invention, at least a portion of the Y direction supporting part (33) is formed into the inclined surface (31a). Therefore, in the case where the Y direction elastic part (24) connects obliquely the projecting part (15) and the Y direction supporting part (33), the spring constant can be heightened when the compressed Y direction elastic part (24) is configured to receive the inclined surface (15a) substantially in the perpendicular direction.

According to the fifth feature of the present invention, since the intermediate member (70) made of a rigid material is integrally combined with the intermediate portion of the Y direction elastic part (24) located between the Y direction supporting part (33) and the projecting part (15), the spring constant of the Y direction elastic part (24) can be heightened by this intermediate member (70).

According to the sixth feature of the present invention, since the inner member (30) is formed in a cylindrical shape, and the cylindrical end in the Y direction thereof is formed as the Y direction supporting part (33), the cylindrical inner member (30) is not required to be provided with a special projecting part for supporting the Y direction elastic part (24), whereby it can be used while keeping the form of a simple cylindrical member.

According to the seventh feature of the present invention, when the fastening member (64) is inserted from the concave part (12d) formed in the cylindrical part (12), the connecting member (60) to be connected to the vibration generating part can be mounted in a state of being placed on the inner member (50). Moreover, since the fastening portion (52) which is provided in the inner member (50) for mounting the fastening member (64) is arranged in the position offset from the middle of the inner member (50) toward the front side opening (12e) in the Y direction, attachment and detachment operation by the fastening member (64) can be easily performed through the concave part (12d).

According to the eighth feature of the present invention, since the inner member (30) is supported by the Y direction elastic part (24) in a cantilever manner and the Y direction elastic part (24) is larger in thickness than the X direction elastic part (22), the spring constant in the Y direction of the Y direction elastic part (24) can be heightened sufficiently even if the Y direction elastic part (24) supports the inner member (30) in a cantilever manner.

BEST MODE FOR CARRYING OUT THE INVENTION

Figure 1:
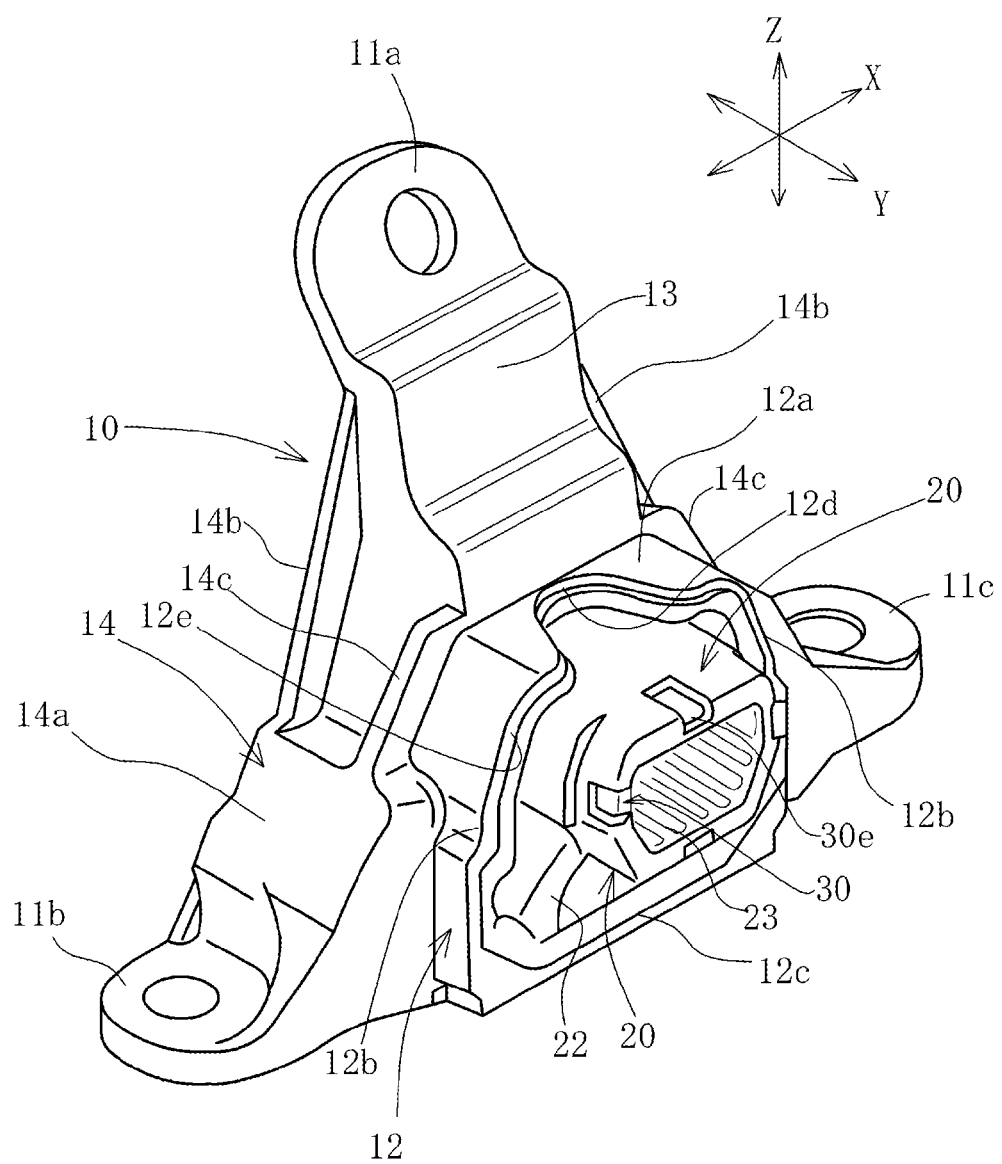
FIG. 1 is a perspective view of a vibration isolating device in accordance with a first embodiment.

Hereinafter, an embodiment formed as an engine mount will be described with reference to the accompanying drawings. First, a first embodiment will be described with reference to FIGS. 1 through 4. In the description, letting orthogonal triaxial directions of the engine mount be X, Y and Z, Z is an inputting direction of a static load, and X and Y are two directions intersecting at right angles to each other within a plane orthogonal to Z.

Moreover, in a state where the engine mount is mounted on a vehicle, the X direction corresponds to a forward and rearward direction of the vehicle, the Y direction corresponds to a left and right direction thereof, and the Z direction corresponds to an upper and lower direction thereof, respectively. In addition, a front side and a back side of the engine mount are arranged so as to be oriented to the left and right direction, and so the front side and the back side are located in the Y direction (the right side in FIG. 4 shall be the front side and the left side shall be the back side). Each of the X, Y and Z directions is indicated by arrows in the drawings.

Referring now to FIG. 1, the engine mount has a bracket 10 and an elastic body 20 provided in a cylindrical part 12 which is formed in the middle of a lower part of the bracket 10. An inner member 30 (FIG. 4) is integrally combined with the elastic body 20.

The bracket 10 is of a triangular shape in a front view, and each of apexes thereof is provided with a mounting portion 11a, 11b, 11c having a through hole. These mounting portions 11a, 11b, 11c are bolted on a vehicle body (a reference character 42 in FIG. 4) functioning as a vibration receiving part, respectively. Herein, the mounting portion 11a is oriented in the Z direction, and the mounting portions 11b and 11c are oriented in the X direction.

The mounting portion 11a is located on an upper end portion of an upper projecting part 13 which projects upwardly from a periphery of the cylindrical part 12. The mounting portions 11b and 11c are located on distal end portions of a forward and rearward projecting part 14 which projects in the X direction from the cylindrical part 12. An upper surface 14a (see FIG. 1) of the forward and rearward projecting part 14 is formed with an inclined surface which is downwardly inclined from a base portion of the mounting portion 11a toward each of the mounting portions 11b, 11c. There are integrally formed a back side rib 14b which connects obliquely the upper surface 14a and the upper projecting part 13, and a front side rib 14c which extends obliquely along an upper portion of a lateral side of the cylindrical part 12.

The bracket 10 is reinforced with these ribs 14b, 14c, and the periphery of the cylindrical part 12 also is reinforced with these ribs. Particularly, the cylindrical part 12 has a through hole bored in the Y direction, and both ends in an axial direction of the cylindrical part 12 open widely. One on the front side of these openings is designated as a front side opening 12e. In addition, an opening on the back side has approximately the same size as the front side opening 12e. Therefore, although the strength of the bracket 10 is lowered due to such wide opening, it can be covered by these ribs.

The back side (the side shown in FIG. 3) of the bracket 10 forms a mounting face to the vehicle body side. This mounting face is formed as a substantially flush flat surface to be placed on and attached to the vehicle body.

However, three small back side ribs 13d which are slightly protruded and extend in the Z direction are formed on the back side of the upper projecting part 13 of the bracket 10 in a side by side relationship in the X direction.

The cylindrical part 12 is formed in a square cylindrical shape having a substantially quadrangular opening part in a front view and has an upper wall 12a, front and rear lateral walls 12b, and a bottom 12c. In the upper wall 12a there is provided an upper wall concave part 12d which is recessed toward the back side (see FIG. 1).

Figure 4:
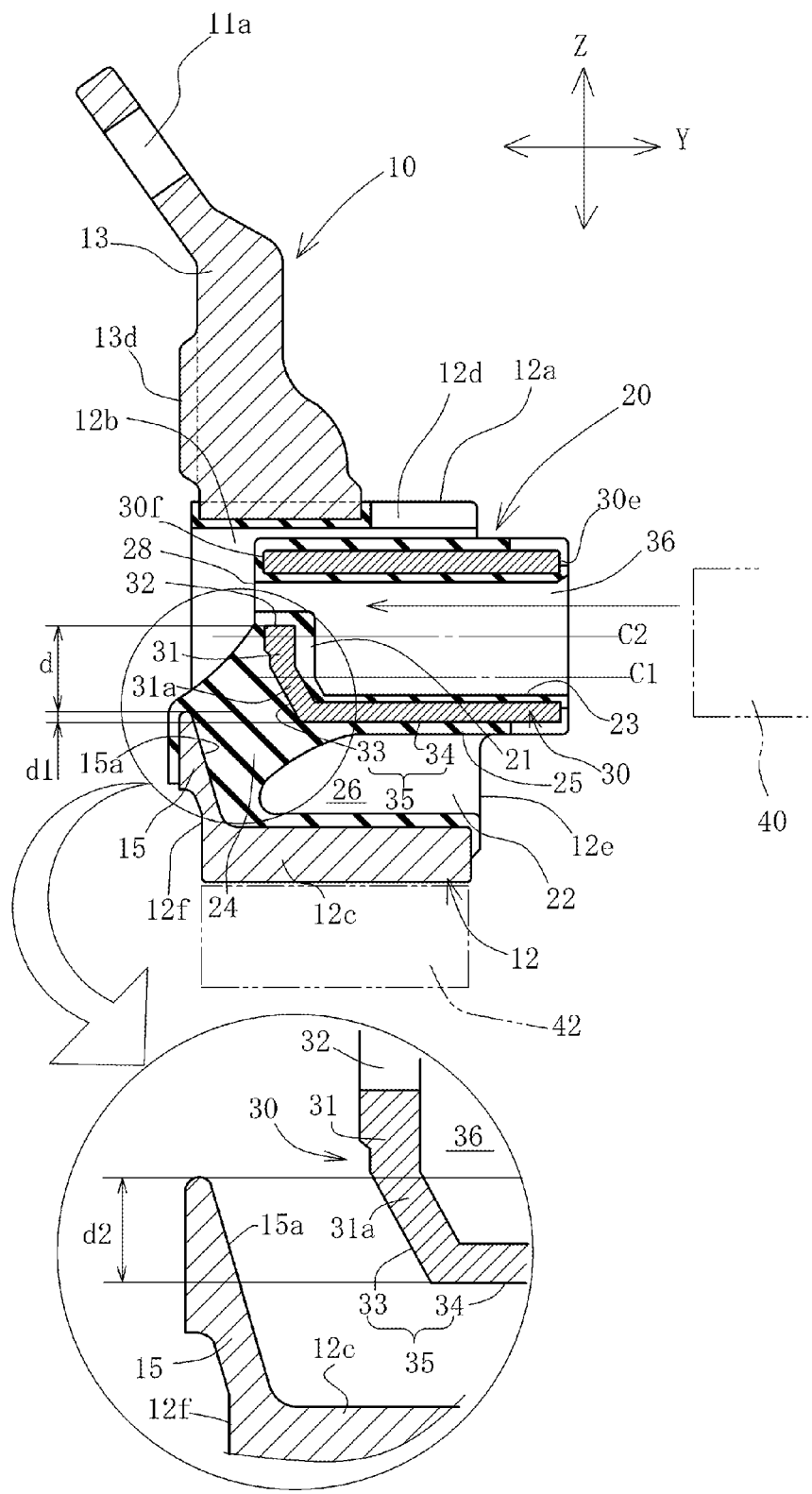
FIG. 4 is a cross sectional view taken on line 4-4 of FIG. 2.
Figure 5:
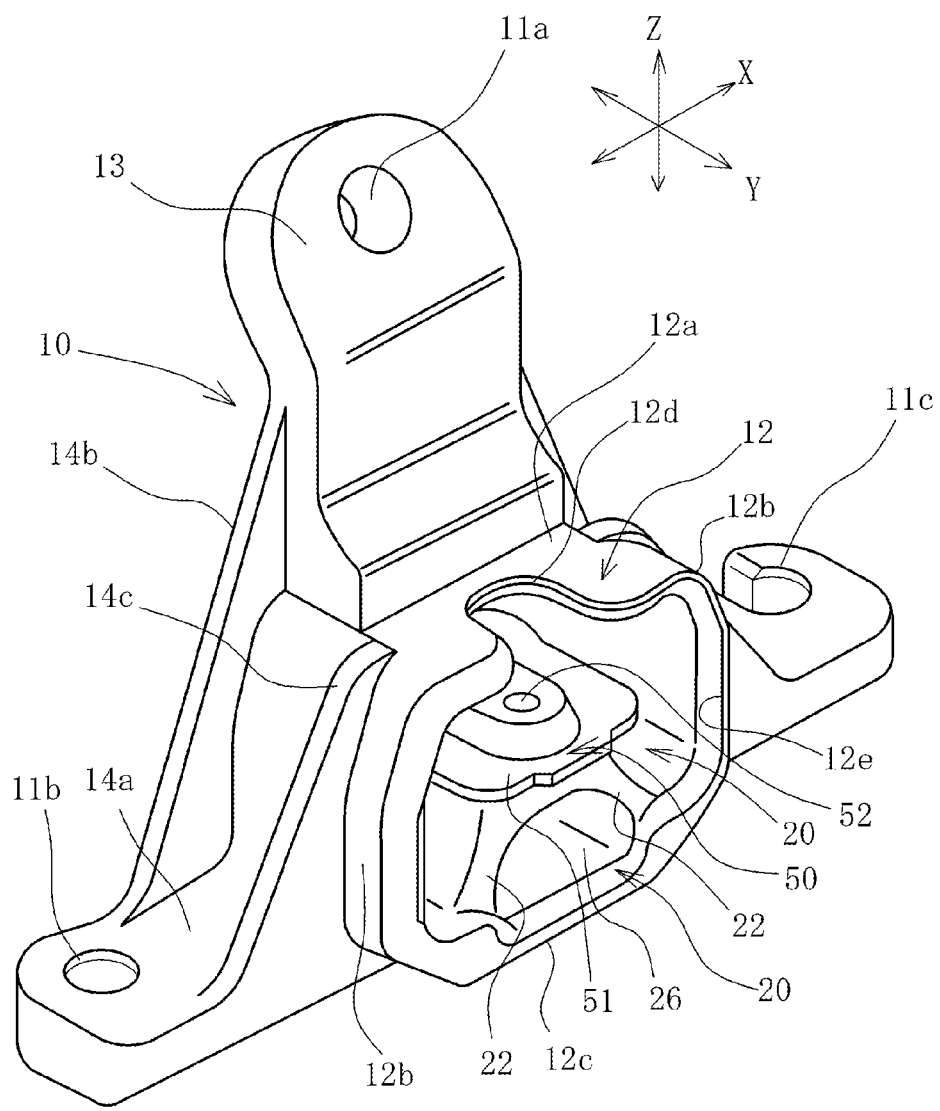
FIG. 5 is a perspective view of the vibration isolating device in accordance with a second embodiment.

As shown in FIG. 4, the cylindrical part 12 is arranged in such a manner that an axis C1 of the cylindrical part 12 is oriented in the Y direction. Within the cylindrical part 12, there is arranged the elastic body 20 which is integrally combined with the inner member 30. The cylindrical part 12 has the front side opening 12e formed by opening one end in the Y direction thereof. The inner member 30 is able to be inserted into and arranged in the cylindrical part 12 from the front side opening 12e, and a projecting part 15 which projects upwardly in the drawing is integrally provided on a back side end portion 12f.

The greater portion of the projecting part 15 is located in an interior of the cylindrical part 12, and a surface of the projecting part 15 facing the front side has a rearwardly inclined surface 15a which is inclined in such a way as to allow an upper side thereof to approach the back side.

The inner member 30 is a bottomed hollow member and has a square cylindrical shape of a smaller external form than the front side opening 12e of the cylindrical part 12. The inner member 30 is arranged to be oriented in the Y direction in a state where an axis C2 thereof extends in parallel with the axis C1.

A hollow part 36 which is an axial hole of the inner member 30 opens to the front side at one end portion 30e on the front side in the Y direction (a front side end portion). One end of an engine bracket 40 is press fitted into the hollow part 36 from the front side end portion 30*e*. The other end of the engine bracket 40 is mounted on an engine (not shown) of a vibration generating part. In addition, the bottom 12*c* of the cylindrical part 12 is mounted on the vehicle body 42.

The other end portion (a back side end portion) 30*f* of the inner member 30 is nearly closed by a bottom wall 31. The bottom wall 31 is a vertical wall portion orthogonal to the axis C2, and a lower portion of the bottom wall 31 has a chamfered shape and is formed as an inclined surface part 31*a*. Within the cylindrical part 12, the bottom wall 31 is arranged so as to be spaced apart from the projecting part 15 toward the front side and located obliquely above the projecting part 15. The inclined surface part 31*a* has an inclined surface which is opposed to and extends in parallel with the inclined surface 15*a* of the projecting part 15. The inclined surface of the inclined surface part 31*a* forms the greater portion of a Y direction supporting part 33.

The elastic body 20 covers a periphery of the inner member 30. A portion of the elastic body 20 extends downwardly substantially in the form of an arm so as to form an X direction elastic part 22 and a Y direction elastic part 24.

In addition, an interior of the inner member 30 is also covered with the elastic body 20. Namely, a bottom wall inner surface covering 21 which is continued from the Y direction elastic part 24 is formed on an inner surface side of the bottom wall 31 facing a central side of the hollow part 36, and an inside covering 23 which is continued from the bottom wall inner surface covering 21 covers an inside surface surrounding the hollow part 36 of the inner member 30.

Further, also an outer surface of a lower part of a lateral side wall which is formed in the direction orthogonal to the cylindrical part 12 is covered with an outside covering 25 which is continuous with the X direction elastic part 22 so as to extend forwardly in the Y direction.

By the way, the X direction elastic parts 22 are provided in pairs at opposite sides in the X direction across the inner member 30. The pair of X direction elastic parts 22 is configured to provide an oblique connection between the inner member 30 and the bottom 12*c* of the cylindrical part 12 (see FIG. 2) whereby to serve as a main body of vibration absorption in the X direction (the forward and rearward direction).

The Y direction elastic part 24 is provided solely on the back side in the Y direction. The Y direction elastic part 24 is configured to provide an oblique connection between the inclined surface 15*a* and the inclined surface part 31*a* and supports a back side end portion 30*f* of the inner member 30 in a cantilever manner with respect to the cylindrical part 12 (see FIG. 4) whereby to serve as a main body of vibration absorption in the Y direction.

An elastic wall (walls on three sides) surrounding three sides of a central space 26 is formed by the pair of X direction elastic parts 22 and the single Y direction elastic part 24. An elastic wall in the X direction of the elastic wall formed of walls on the three sides is the X direction elastic part 22, and an elastic wall in the Y direction thereof is the Y direction elastic part 24.

The central space 26 opens on the front side. Therefore, when the central space 26 is molded with a metal mold, the walls on the three sides which surround the central space 26 on the three sides are molded simultaneously, so that the elastic wall formed of the walls on the three sides can be easily molded by utilizing the central space 26.

Further, the bottom wall 31 of the cylindrical part 12 is embedded in and integrated with an interior of the Y direction elastic part 24, and an outer surface of the bottom wall 31 is formed as the Y direction supporting part 33 for supporting an upper end portion of the Y direction elastic part 24.

In addition, an outer surface of a lower portion of the cylindrical part 12 which is in contact with the outside covering 25 is formed as an X direction supporting part 34 for supporting an upper end portion of the X direction elastic part 22. An extension in the Y direction of the X direction supporting part 34 overlaps with at least a portion of the projecting part 15 by a dimension d1.

The Y direction supporting part 33 and the X direction supporting part 34 are connected to the upper end portion of the Y direction elastic part 24 and the outside covering 25 which extends from the Y direction elastic part 24, to thereby restrict them. At the time of displacement in Y direction of the inner member 30, the Y direction supporting part 33 and the X direction supporting part 34 are moved in the Y direction together with the inner member 30, so that the upper end portion of the Y direction elastic part 24 and the outside covering 25 are elastically deformed.

FIG. 4 shows an initial state where a static load of the engine is not placed on the inner member 30 (except for an encircled part).

In this initial state, a distance between an upper end of the projecting part 15 and an upper end of the bottom wall 31 is d. Namely, the bottom wall 31 extends upward above the projecting part 15 by d. When the static load of the engine is placed on the inner member 30, the inner member 30 is moved downward. This state is shown in a circled enlarged part of FIG. 4. Herein, the elastic body is omitted from this enlarged part for better understanding. In the enlarged part, the inner member 30 is moved downward due to the static load of the engine, and almost the whole of the inclined surface part 31*a* overlaps with the projecting part 15 in the Y direction by the dimension d2.

A portion of the elastic body 20 is continued further from the X direction elastic part 22 and the Y direction elastic part 24 and extends around the periphery so as to cover the bottom 12*c* of the cylindrical part 12 and then to cover integrally inner surfaces of the upper wall 12*a*, the left and right lateral walls 12*b* (FIG. 2) of the cylindrical part 12.

By the way, a bottom opening 32 is formed in an upper portion of the bottom wall 31. At the time of molding the elastic body 20, a portion of the elastic body 20 passes through the bottom opening 32 and enters an interior of the hollow part 36 whereby to be configured to form the bottom wall inner surface covering 21 and the inside covering 23. A back side opening 28 is formed in a position of the bottom opening 32 by a part of the elastic body 20 which covers the bottom wall 31.

A tip portion of the engine bracket 40 is press fitted into the hollow part 36 of the inner member 30, so that the engine bracket 40 is attached to the inner member 30. At that time, since the bottom wall inner surface covering 21 and the inside covering 23 are provided in the hollow part 36 of the inner member 30 and interposed between the engine bracket 40 and the inner member 30, they are configured to prevent the contact between metals.

Figure 2:
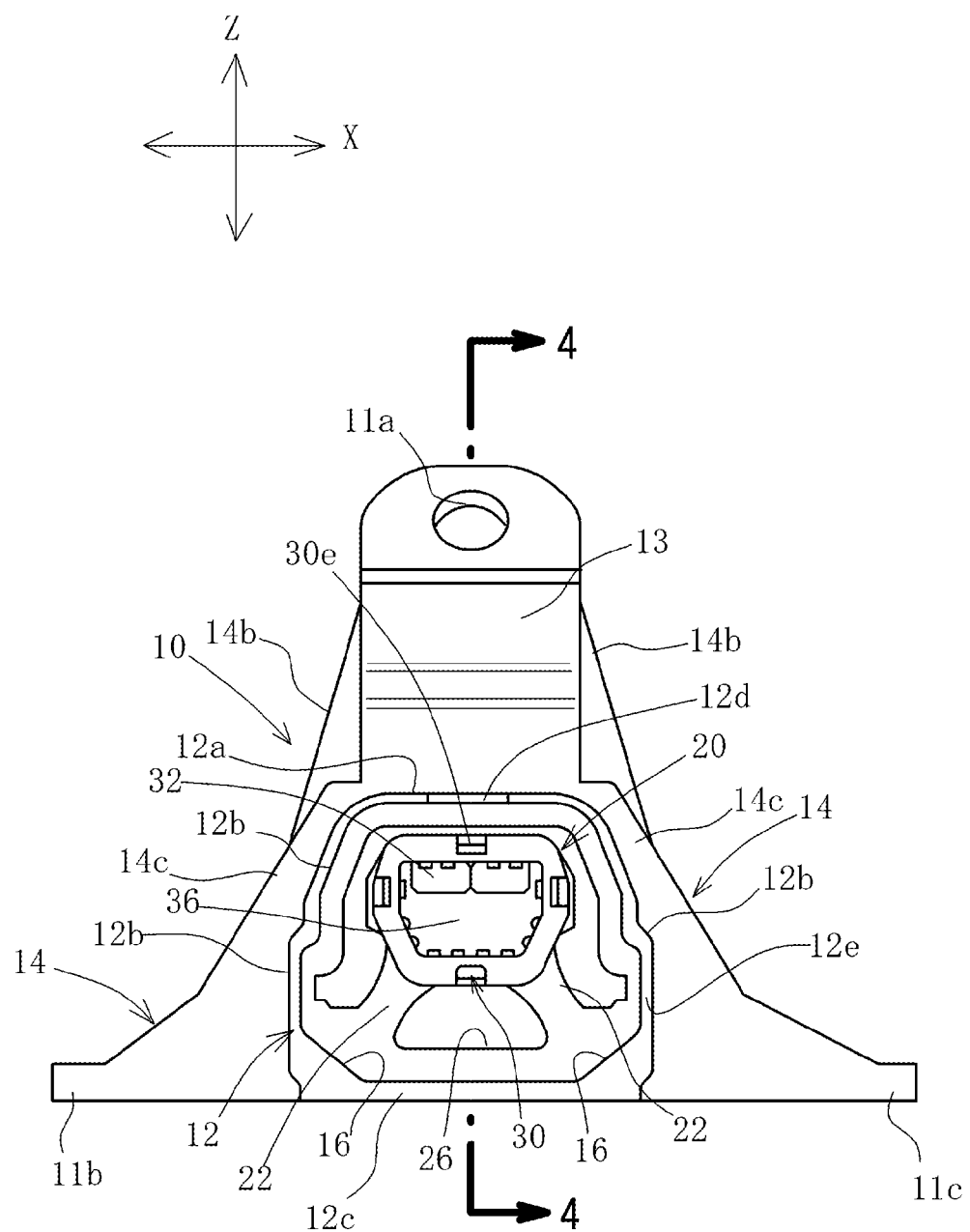
FIG. 2 is a front view of the vibration isolating device.
Figure 3:
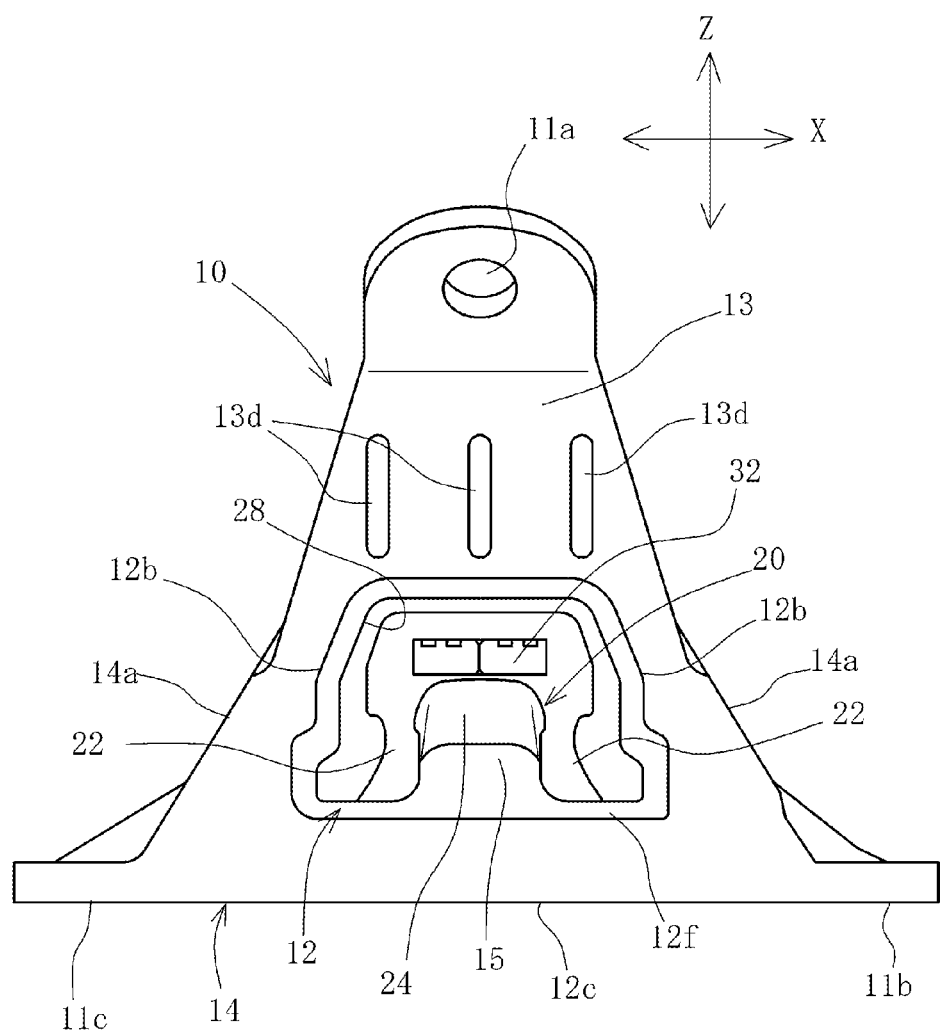
FIG. 3 is a rear view of the vibration isolating device.

As shown in FIGS. 1 to 3, the X direction elastic parts 22 provide a connection in the form of truncated chevron shape between each of X direction lateral surfaces of the inner member 30 and each of inclined corner parts 16 of the cylindrical part 12. At the time of the X direction displacement which allows the inner member 30 to be moved in the X direction by the vibration in the X direction, the X direction elastic parts 22 are elastically deformed at a predetermined spring constant.

The X direction elastic parts 22 are set to be thinner in thickness and smaller in the spring constant than the Y direction elastic body 24. In addition, since the inclined corner parts 16 bear lower end portions of the X direction elastic parts 22, they are able to bear substantially at right angles the X direction elastic parts 22 which are inclined substantially in the form of truncated chevron shape, so as to allow them to be subjected to the elastic deformation consisting mainly of compressive deformation. Thus, it is possible to heighten the spring constant.

The elastic body 20 is integrated with the inner member 30 in such a manner that in a state where the inner member 30 is arranged concentrically within the cylindrical part 12, a raw material of the elastic body 20 made of proper material such as rubber or the like is injected into between the cylindrical part 12 and the inner member 30 and hardened.

Although the molding of this elastic body 20 is performed by opening the metal mold in the Y direction (hereinafter, referred to as mold opening in the left and right direction), since the central space 26 is open at the front side, the central space 26 and the Y direction elastic body 24 are formed by the simple mold opening in the left and right direction.

Next, operation and effect of this embodiment will be described. In FIG. 2, when the vibration in the X direction is inputted to the inner member 30, the inner member 30 is moved in the X direction so as to be displaced in the X direction, so that the pair of X direction elastic parts 22 opposed to each other in the X direction is elastically deformed to absorb the vibration. At the time of the excessive displacement in the X direction which allows the inner member 30 to be moved larger due to the excessive vibration, the inner member 30 comes into contact with the forward and rearward lateral walls 12b whereby the excessive movement is regulated.

On the other hand, in FIG. 4, when the vibration in the Y direction is inputted, the inner member 30 is moved in the Y direction so as to be displaced in the Y direction, so that the Y direction elastic part 24 which is provided solely on the back side is elastically deformed to absorb the vibration.

At that time, on the front side in the Y direction, there is not provided a member functioning as a stopper such as the lateral walls 12b in the X direction. However, since the Y direction elastic part 24 in the form of the cantilever is configured to be thick and short such that the spring constant 24 of the Y direction elastic part 24 is heightened sufficiently, the vibration in the Y direction can be surely absorbed, and the excessive displacement in the Y direction which allows the inner member 30 to be moved excessively to the front side can be regulated. In addition, at the time of the excessive displacement in the Y direction, the excessive movement of the inner member 30 toward the back side can be prevented by the projecting part 15.

Like this, the projecting part 15 is provided only on one side (back side) in the Y direction of the cylindrical part 12, and the end portion on the back side of the inner member 30 is supported by the Y direction elastic part 24. Moreover, the Y direction elastic part 24 is configured to be thicker, larger and shorter than the X direction elastic part 22. With this construction, the spring constant in the Y direction of the Y direction elastic part 24 is heightened sufficiently whereby to make the cantilevered support possible.

Further, since the projecting part 15 is formed long enough to overlap at least partially with the inner member 30 in the Y direction and functions as a support part of the Y direction elastic part 24, the Y direction elastic part 24 can be elastically deformed between the Y direction supporting part 33 and the projecting part 15. In addition, in the case where the inner member 30 is moved to the back side (the left side in FIG. 4), it is subject mainly to the compressive deformation. Therefore, the spring constant in the Y direction of the Y direction elastic part 24 can be heightened.

At that time, since the spring constant is able to be varied by changing the size and the like of the Y direction support part 33 and/or the projecting part 15, the spring constant may be easily adjusted.

Moreover, the inner member 30 is provided on the surface thereof with the X direction supporting part 34 for supporting the X direction elastic part 22, and this X direction supporting part 34 is configured to overlap at least partially with the projecting part 15 in the Y direction. Therefore, a portion of the X direction elastic part 22 can be elastically deformed between the X direction supporting part 34 and the projecting part 15 at the time of the displacement in the Y direction which allows the inner member 30 to approach the projecting part 15. Accordingly, the spring constant in the Y direction of the elastic body 20 can be heightened.

Furthermore, the inclined surface 15a is provided on the projecting part 15, and the inclined surface part 31a which is located in an obliquely upward position of the inclined surface 15a in a face to face relationship is formed as substantially a parallel inclined surface. Then, the inclined surface 15a and the inclined surface part 31a are obliquely connected to each other by the Y direction elastic part 24. With this construction, when the inclined surface part 31a is moved so as to approach the projecting part 15 at the time of the displacement in the Y direction of the inner member 30, the inclined surface 15a and the inclined surface part 31a are configured to receive the Y direction elastic part 24a substantially from the perpendicular direction, so that the Y direction elastic part 24 can be elastically deformed between the inclined surface 15a and the inclined surface part 31a to thereby be able to heighten the spring constant.

In addition, the inclined surface of the inclined surface part 31a is a inclined surface forming at least a portion of the Y direction supporting part 33 and is formed on a surface side of the inclined surface part 31a facing at least the inclined surface 15a. Moreover, it shall be sufficient to provide the inclined surface on at least one of the projecting part 15 and the Y direction supporting part 33. For example, without providing the inclined surface on the projecting part 15, only the Y direction supporting part 33 may be provided with the inclined surface. On the contrary, the inclined surface may be provided only on the projecting part 15 and may not be formed on the Y direction supporting part 33. This example will be explained with reference to a third embodiment (FIG. 9) to be referred to later.

By the way, the spring constant of the Y direction elastic part 24 may be adjusted by changing a projecting amount or an inclined angle of the projecting part 15, the volume of the Y direction elastic part 24, the size of a supporting part 35, an inclined angle of the inclined surface part 31a, and the like.

Further, as shown in FIG. 4, since the projecting part 15 and the bottom wall 31 are connected to each other by the Y direction elastic part 24 within the cylindrical part 12, the Y direction elastic part 24, the projecting part 15 and the Y direction supporting part 33 which support the Y direction elastic part 24 can be provided in the interior of the cylindrical part 12, and the Y direction supporting part 33 of the inner member 30 which faces the projecting part 15 can be configured not to project outwardly of the cylindrical part 12.

Therefore, since the projecting part 15 is located on the back side and does not project outwardly (downward in the drawing) from the bottom 12c at the time the cylindrical part 12 is mounted on the vehicle body 42 side, the cylindrical part 12 does not interfere with the vehicle body 42 which supports the bottom 12c. Accordingly, the degree of freedom in layout at the time of being mounted on the vehicle body 42 can be increased.

Further, even if the end 12f on the back side of the cylindrical part 12 approaches the vehicle body side when the cylindrical part 12 is mounted on the vehicle body side for example, the greater portion of the cylindrical part 12 and the bottom wall 31 are located within the cylindrical part 12, and the inner member 30 does not project toward the back side. Moreover, although the upper end portion of the projecting part 15 projects from the end 12f on the back side toward the back side in the Y direction, the projecting amount of the upper end portion is substantially the same as the rib 13d, and there is no projecting part which projects from the bottom 12c to the back side more than the upper end portion of the projecting part 15. Therefore, since it hardly interferes with a vehicle body part and the like on the back side, the degree of freedom in layout at the time of being mounted on the vehicle body 42 can also be increased in this respect.

Further, since the Y direction supporting part 33 is provided on an end surface in the Y direction of the inner member 30, there is no need for particularly providing a relatively large projecting part which projects outwardly of the cylindrical part 12 from the inner member 30.

Therefore, there is no possibility that the above relatively large projection interferes with the surrounding members as seen in the prior art. Moreover, also at the time of the excessive displacement in the Y direction of the inner member 30, there is no possibility of interference with the surrounding members. Accordingly, the degree of freedom in layout with respect to the surrounding members can be increased.

In addition, since the bottom wall 31 of the inner member 30 of a cylindrical shape is utilized as a supporting part of Y direction elastic part 24 on the inner member side, the supporting part of the Y direction elastic part 24 can be easily formed, and the construction of the inner member 30 can be simplified.

Furthermore, since as a supporting part of the Y direction elastic part 24 there is no need for particularly providing the relatively large projecting part as seen in the prior art, which projects outwardly of the cylindrical part 12 from the inner member 30, the increase in weight of the inner member 30 can be suppressed, and the decrease in a characteristic value of the engine bracket 40 which provides a connection between the engine and the inner member 30 can be prevented.

Further, since the bottom 12c is formed as a flush flat surface at the front side of the projecting part 15, and the central space 26 of the elastic body 20 is open to the front side, the metal mold is inserted from the front side into between the inner member 30 and the bottom 12c at the time of molding the elastic body 20, so that the Y direction elastic part 24 can be formed integrally with the projecting part 15.

Therefore, the elastic body 20 in the shape of walls on three sides can be molded only by clamping and patterndrawing of the metal mold from the Y direction, whereby the metal mold construction becomes simple and the molding becomes easy.

Further, the back side rib 14b and the front side rib 14c are connected to the periphery of the cylindrical part 12. Therefore, the periphery of the cylindrical part 12 is formed with these ribs, and the cylindrical part 12 is reinforced by these ribs. Thus, even if the opening 12e on the front side of the cylindrical part 12 is made larger, the rigidity of the cylindrical part 12 can be increased sufficiently and the rigidity as a whole can be maintained at the predetermined level.

Next, a second embodiment will be described with reference to FIGS. 5 to 8. By the way, the inner member 30 is mainly modified in this embodiment. With respect to unmodified identical parts to the first embodiment, like elements are given like reference characters, and the overlapping description will be basically omitted (the same applies to the following embodiments.

Figure 6:
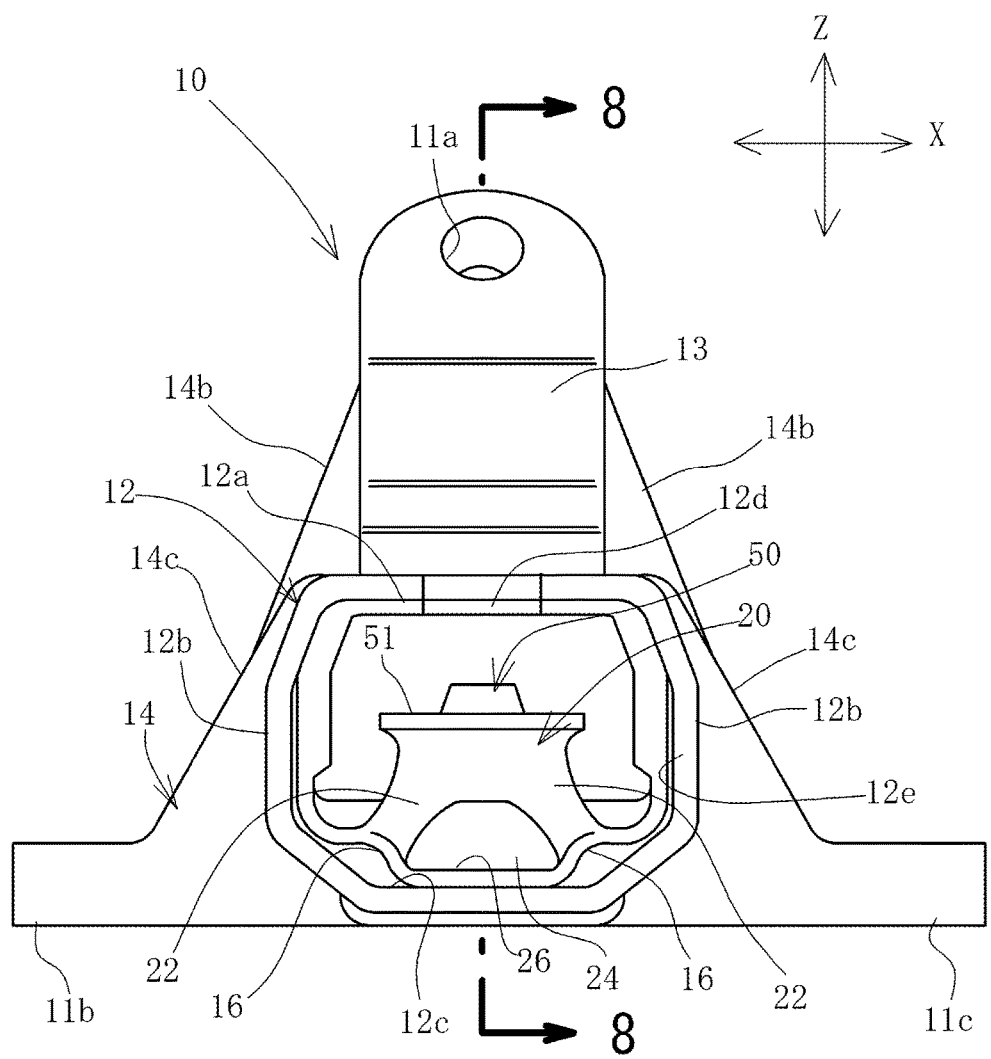
FIG. 6 is a front view of the vibration isolating device.
Figure 7:
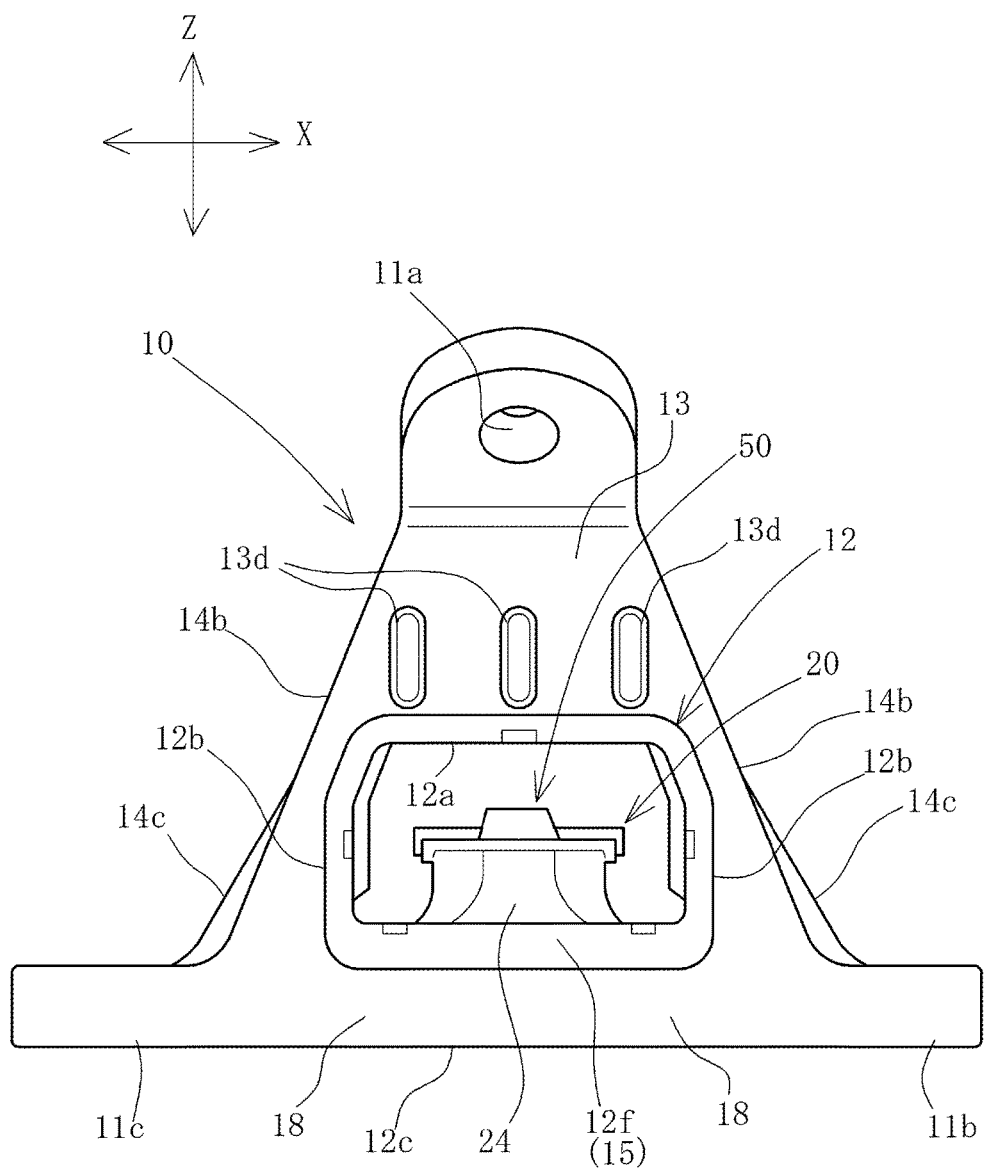
FIG. 7 is a rear view of the vibration isolating device.

An inner member 50 which corresponds to the inner member 30 and functions as a mounting member of an engine bracket 60 (see FIG. 8) is formed in the shape of substantially a trapezoid in a front view (FIG. 6). The inner member 50 is embedded in and integrated with a central part of the elastic body 20. An upper surface 51 of the inner member 50 is exposed outward, and a screw hole 52 extends downwardly from the upper surface 51.

The screw hole 52 is located in a position below a middle portion of the upper wall concave part 12d such that a bolt 64 (FIG. 8) passes through the upper wall concave part 12d so as to be attachable to and detachable from the screw hole 52. Therefore, in the Y direction, the position of the screw hole 52 is arranged to be offset to the front side with respect to a center in the Y direction of the inner member 50 whereby the attachment and detachment of the bolt 64 can be performed easily. Herein, the bolt 64 is an example of a fastening member and the screw hole 52 is an example of a fastening portion. Known various fastening constructions may be employed without limiting to the fastening by the bolt.

Figure 8:
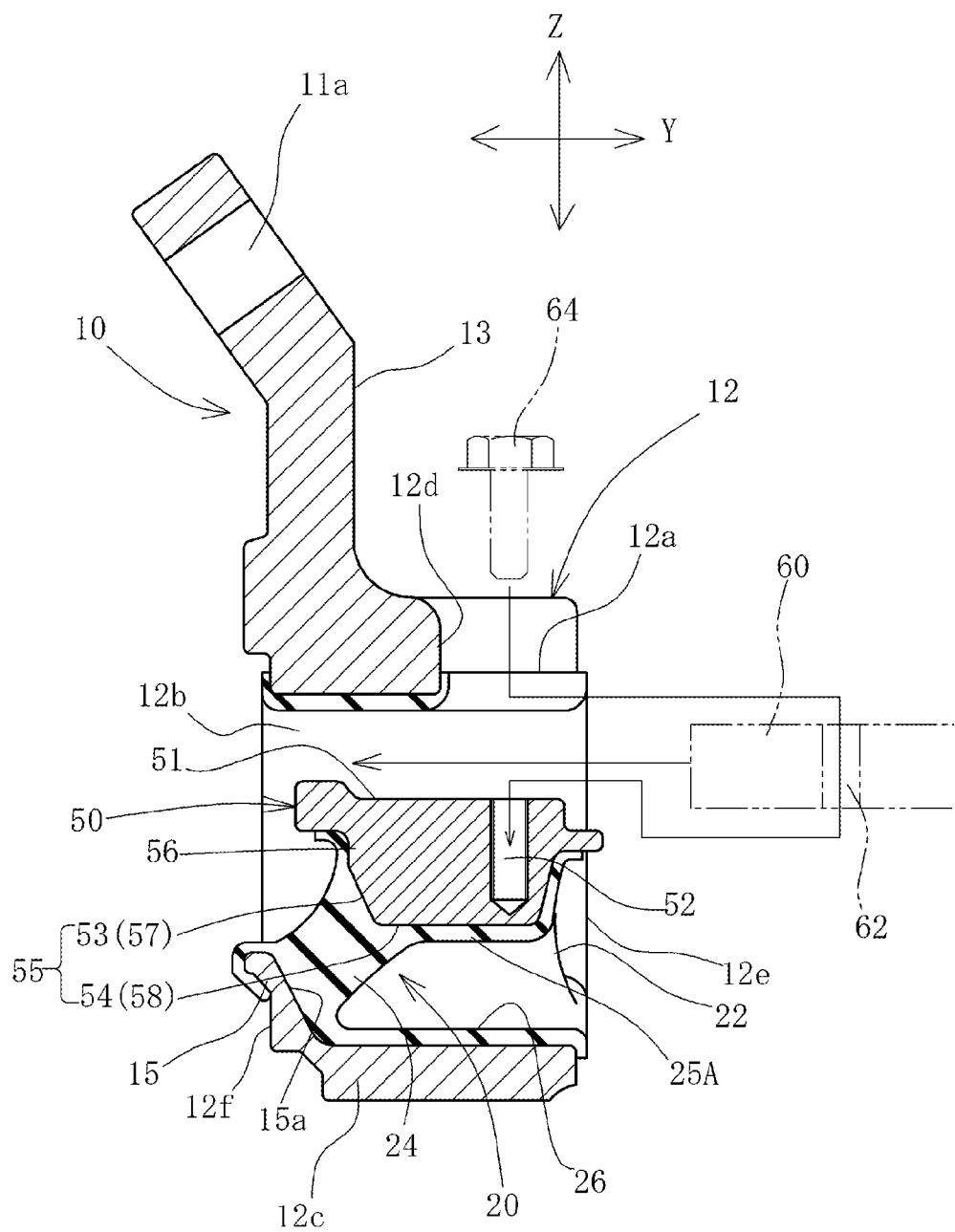
FIG. 8 is a cross sectional view taken on line-8-8 of FIG. 6.

In FIG. 8, a lateral wall 56 on the back side of a peripheral wall of the inner member 50 faces the projecting part 15 in a spaced relationship to each other and is connected to the projecting part 15 by the Y direction elastic part 24. A surface of this lateral wall 56 to which the Y direction elastic part 24 is connected is formed as a Y direction supporting part 53. A portion of this Y direction supporting part 53 is configured to form an inclined surface part 57 extending substantially parallel to the projecting part 15.

By the way, a state shown in the drawing is an initial state where a static load of the engine is not placed on the inner member 50, and the Y direction supporting part 53 does not overlap with the projecting part 15 in the Y direction. However, the inner member 50 is displaced downwardly in the drawing in the state where the static load of the engine is placed on the inner member 50, so that the Y direction supporting part 53 overlaps with the projecting part 15 in the Y direction.

Further, a lower surface 58 of the inner member 50 is covered with an outside covering 25A which extends integrally from the Y direction elastic part 24. A part connected to the outside covering 25A is formed as an X direction supporting part 54. The X direction supporting part 54 extends horizontally long in a cross sectional view in the Y direction as shown in the drawing. A supporting part 55 is formed of the Y direction supporting part 53 and the X direction supporting part 54.

As shown in FIG. 8, the engine bracket 60 is inserted from the front side opening 12e of the cylindrical part 12 and placed on the upper surface 51 of the inner member 50. Then, a through hole 62 of the engine bracket 60 is aligned with the screw hole (the fastening portion) 52, and the bolt 64 is inserted into the through hole 62 from an upper side of the upper wall concave part 12d to thereby be fastened to the screw hole 52, so that the engine bracket 60 is connected to the inner member 50.

In this way, the engine bracket 60 can be easily mounted on the inner member 50 in a state of being placed on the inner member 50. Moreover, the screw hole 52 which is provided in the inner member 50 for mounting the fastening member 64 is arranged to be offset from the center in the Y direction of the inner member 50 to the front side opening 12e side. Therefore, a mounting operation of the fastening member 64 which passes through the concave part 12d is further simplified.

Figure 9:
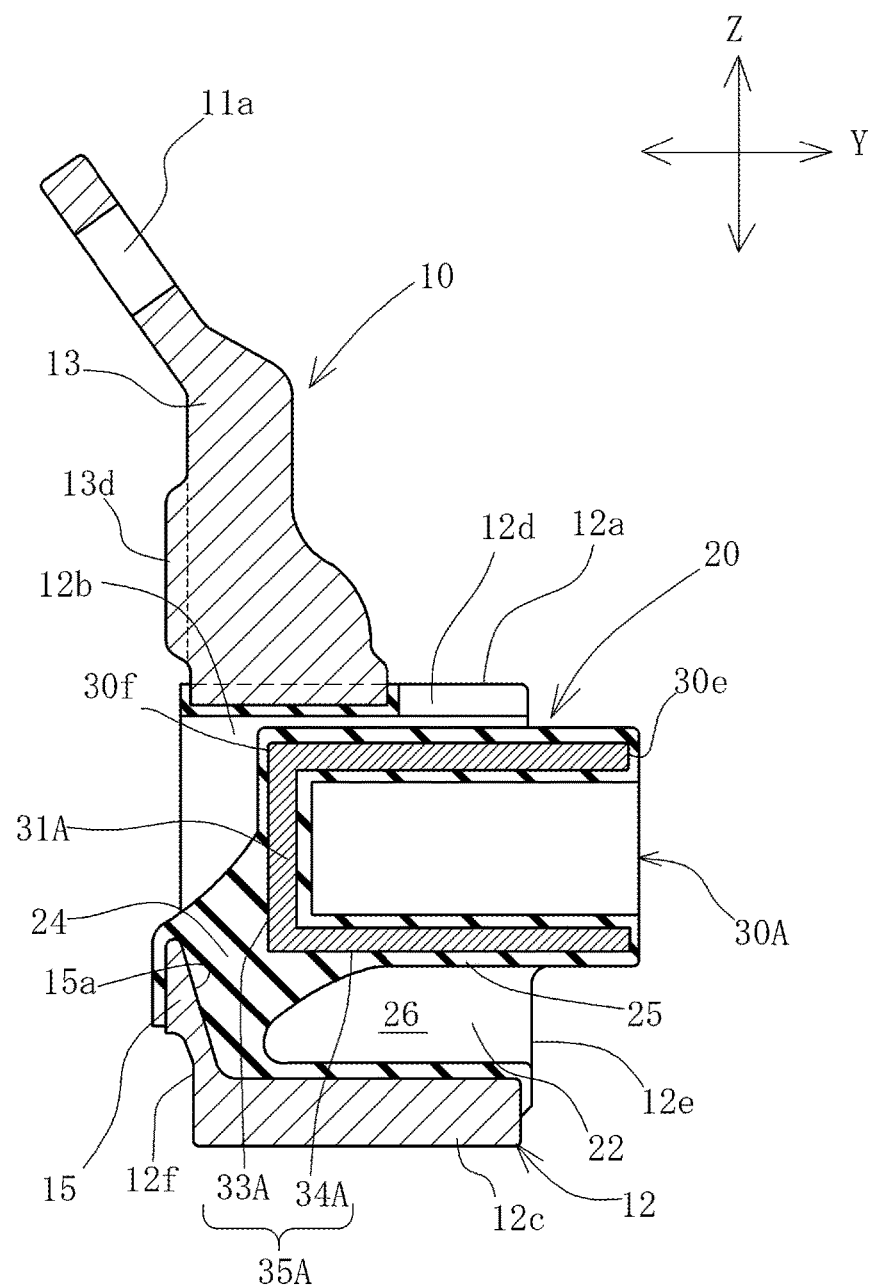
FIG. 9 is a cross sectional view of a region similar to FIG. 4, in accordance with a third embodiment.

Next, a third embodiment will be described. FIG. 9 shows a modified inner member corresponding to that in FIG. 4. In this drawing, an inner member 30B is formed in a bottomed cylindrical shape and characterized by being provided with a bottom wall 31A which is formed of a simple vertical wall and does not have the inclined surface part 31a (FIG. 4) as seen in the first embodiment. In this example, although the inner member 30A is formed in a simple shape, the whole of the bottom wall 31A is able to be configured to function as a Y direction supporting part 33A. In addition, an X direction supporting part 34A is approximately equal to or longer than that of the first embodiment. Therefore, the length of a supporting part 35A in a cross sectional view shown in the drawing becomes longer, so that a restraint area by the inner member 30A with respect to the Y direction elastic part 24 can be increased.

Like this, the inner member 30 can be formed in a simple cylindrical shape. In addition, the Y direction supporting part 33A is formed by the bottom wall 31A which has no inclined surface, and the projecting part 15 is provided with the inclined surface 15a. Therefore, the Y direction elastic part 24 to be elastically deformed can be received by the inclined surface 15a substantially from the perpendicular direction, so that the spring constant can be heightened.

Figure 10:
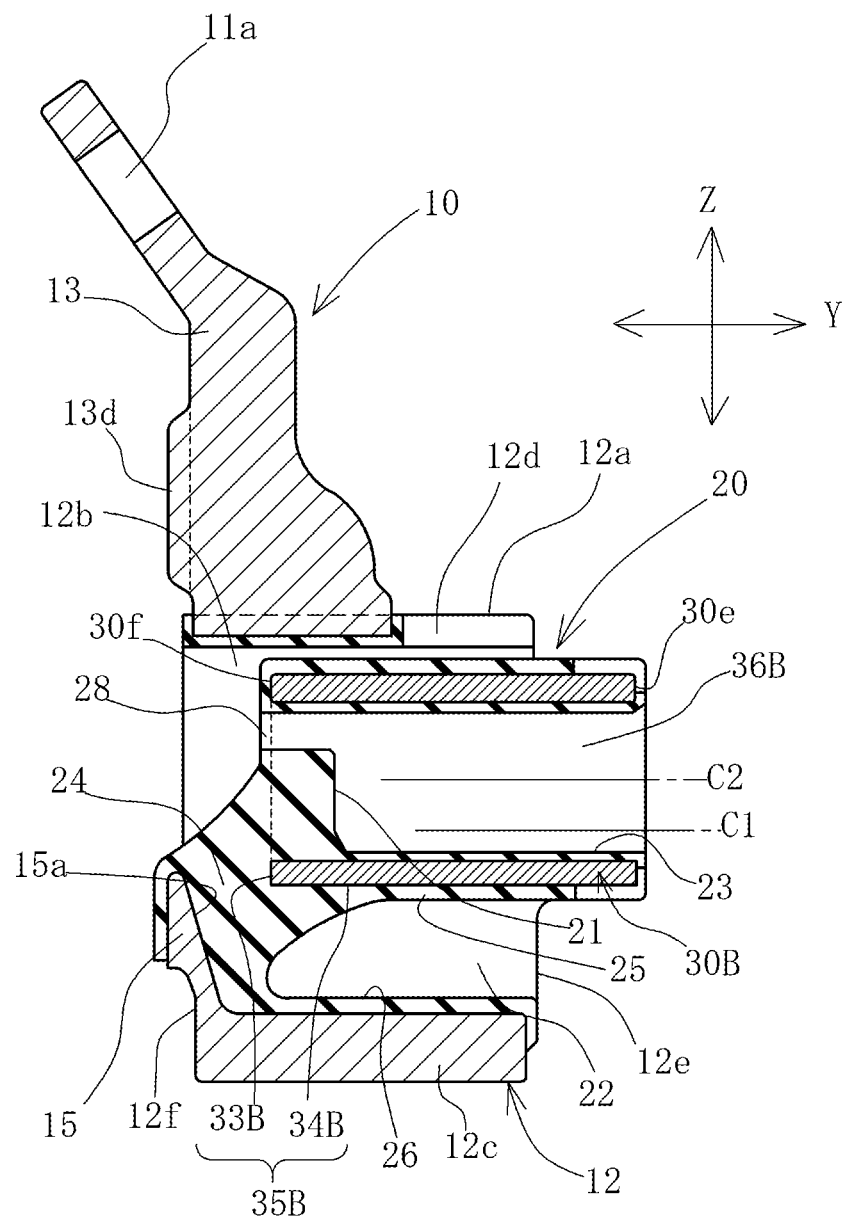
FIG. 10 is a cross sectional view of a region similar to FIG. 4, in accordance with a fourth embodiment.

FIG. 10 shows a fourth embodiment and is a cross sectional view of a region similar to that of FIG. 9. In this example, an inner member 30B is a cylindrical body which has a uniform outer diameter in the longitudinal direction thereof and is formed in the shape of a simple pipe without a bottom.

Also with this configuration, it is possible to form a Y direction supporting part 33B in such a manner that a back side end surface of the inner member 30B overlaps with the projecting part 15 in the Y direction. This Y direction supporting part 33B has approximately the same thickness as that of the pipelike inner member 30B.

Further, an X direction supporting part 34B has a similar length to that of the third embodiment. Therefore, a sufficiently large supporting part 35B can be ensured. Moreover, the inner member 30B can be formed most simply and it is possible to use a pipe on the market, so that cost reduction can be realized.

Figure 11:
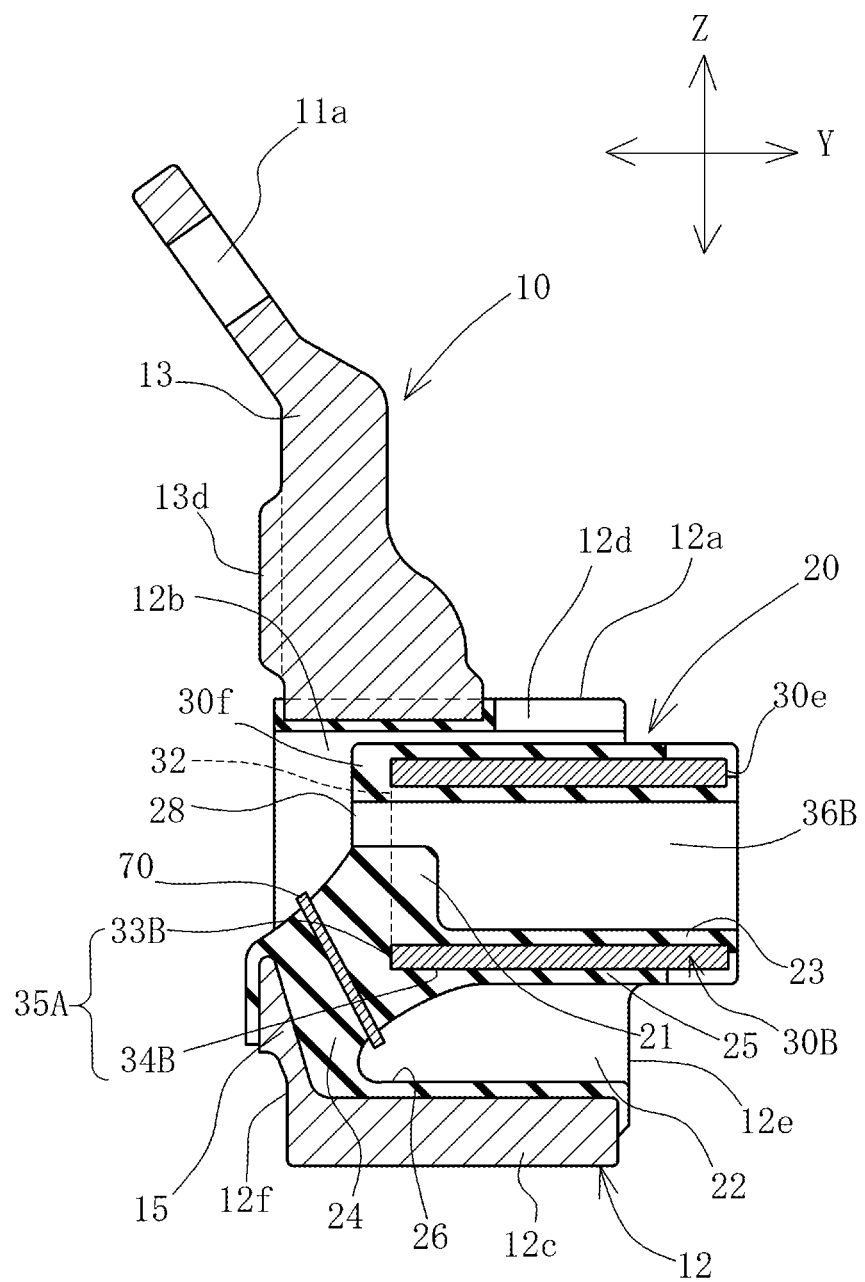
FIG. 11 is a cross sectional view of a region similar to FIG. 4 in accordance with a fifth embodiment.
Figure 12:
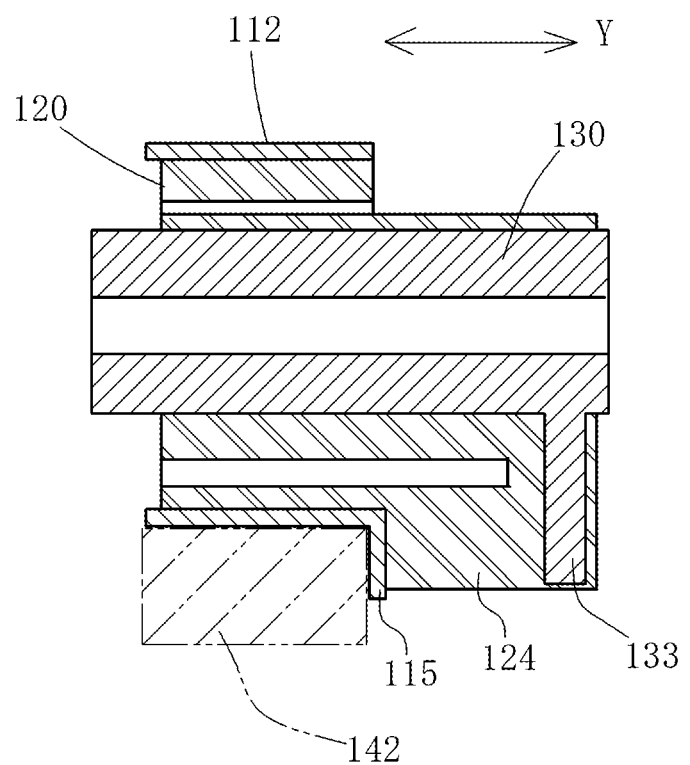
FIG. 12 is a cross sectional view of an essential part of a prior art example.

FIG. 11 shows a fifth embodiment and is a cross sectional view of a region similar to that of FIG. 10. In this example, as shown in FIG. 10, an intermediate plate 70 is provided in the Y direction elastic part so as to adjust the spring constant. The inner member 30B is formed in the shape of a simple pipe similar to FIG. 10.

The intermediate plate 70 is a rigid member such as a metal plate or the like, which is embedded in and integrated with the interior of the Y direction elastic part 24 in such a manner as to extend substantially parallel with the projecting part 15 between the projecting part 15 and the back side end surface of the inner member 30B. Herein, the intermediate plate 70 is not limited to metal but may be made of resin. In addition, it is not limited to a plate shape but may be formed in a thick block shape, for example. Therefore, this intermediate plate 70 is an example of an intermediate member.

With this configuration, when the force in the Y direction is applied from the inner member 30B to the Y direction elastic part 24 at the time of displacement in the Y direction, the Y direction elastic part 24 is elastically deformed by compression or tension between the intermediate plate 70 and the projecting part 15, so that the spring constant can be heightened. Therefore, even when the Y direction supporting part 33B is relatively small as seen in this embodiment, the sufficiently high spring constant can be achieved.

In addition, the inner member to be used for this example is not limited to the one shown in the drawing but may be configured by free combinations of the inner members in the first and third to fifth embodiments. In addition, also a non-tubular inner member such as the inner member 50 in the second embodiment may be combined.

By the way, it is to be understood that the present invention is not limited to each of the above embodiments and that various changes and modifications may be made in the invention. For example, the present invention may be applied to various kinds of vibration isolating devices other than the engine mount.

What is claimed is:

1. A vibration isolating device comprising:
a bracket having a cylindrical part and being mounted on a vibration receiving part side;
an inner member being arranged in the cylindrical part and mounted on a vibration generating part side; and
an elastic body providing an elastic connection between the inner member and the cylindrical part;
wherein letting orthogonal triaxial directions be X, Y and Z, with Z being an inputting direction of a static load, and X and Y being two directions intersecting at right angles to each other within a plane orthogonal to the inputting direction of the static load, the elastic body has an X direction elastic part, which functions as a main body at the time of receiving a vibration in the X direction, and a Y direction elastic part, which functions as a main body at the time of receiving a vibration in the Y direction;
wherein the cylindrical part is in a form of a cylindrical shape passing through in the Y direction and is provided with a front side opening formed by opening one end in the Y direction thereof and a projecting part projecting in the Z direction at a back side end portion of the other end thereof and being arranged so as to be spaced apart on an outside in the Y direction with respect to the inner member within the cylindrical part, and the inner member is provided with a Y direction supporting part, which is located on a Y direction end surface of a back side end of the cylindrical part so as to be opposed in a spaced relationship on the inside in the Y direction with respect to the projecting part; and
wherein the projecting part and the Y direction supporting part are connected within the cylindrical part in a cantilevered manner by the Y direction elastic part, the Y direction elastic part is larger in thickness than the X direction elastic part, and the Y direction supporting part overlaps with at least a portion of the projecting part in the Y direction.

2. The vibration isolating device according to claim 1, wherein the inner member is provided in a portion of a surface thereof with an X direction supporting part, which extends in the Y direction and which are provided in pairs at opposite sides in the X direction across the inner member, and a portion of the X direction supporting part overlaps with at least a portion of the projecting part in the Y direction.

3. The vibration isolating device according to claim 1, wherein a portion of the projecting part which is connected to the Y direction elastic part is formed into an inclined surface, and the inclined surface and the Y direction supporting part are connected obliquely by the Y direction elastic part.

4. The vibration isolating device according to claim 1, wherein at least a portion of the Y direction supporting part is formed into an inclined surface.

5. The vibration isolating device according to claim 1, further comprising an intermediate member made of a rigid material, wherein the intermediate member is integrally combined with an intermediate portion of the Y direction elastic part between the Y direction supporting part and the projecting part.

6. The vibration isolating device according to claim 1, wherein the inner member is formed of a cylindrical member.

7. The vibration isolating device according to claim 1, further comprising a member to be connected to the vibration generating part, wherein the member is placed on the inner member and joined together by a fastening member which is inserted from a concave part formed in the cylindrical part, and the inner member has a fastening portion which allows the fastening member to be connected thereto, and wherein the fastening portion faces the concave part and is arranged in a position offset toward the front side opening.

8. The vibration isolating device according to claim 2, wherein a portion of the projecting part which is connected to the Y direction elastic part is formed into an inclined surface, and the inclined surface and the Y direction supporting part are connected obliquely by the Y direction elastic part.

9. The vibration isolating device according to claim 2, wherein at least a portion of the Y direction supporting part is formed into an inclined surface.

10. The vibration isolating device according to claim 3, wherein at least a portion of the Y direction supporting part is formed into an inclined surface.

11. The vibration isolating device according to claim 2, further comprising an intermediate member made of a rigid material, wherein the intermediate member is integrally combined with an intermediate portion of the Y direction elastic part between the Y direction supporting part and the projecting part.

12. The vibration isolating device according to claim 3, further comprising an intermediate member made of a rigid material, wherein the intermediate member is integrally combined with an intermediate portion of the Y direction elastic part between the Y direction supporting part and the projecting part.

13. The vibration isolating device according to claim 4, further comprising an intermediate member made of a rigid material, wherein the intermediate member is integrally combined with an intermediate portion of the Y direction elastic part between the Y direction supporting part and the projecting part.

14. The vibration isolating device according to claim 2, wherein the inner member is formed of a cylindrical member.

15. The vibration isolating device according to claim 3, wherein the inner member is formed of a cylindrical member.

16. The vibration isolating device according to claim 4, wherein the inner member is formed of a cylindrical member.

17. The vibration isolating device according to claim 5, wherein the inner member is formed of a cylindrical member.

18. The vibration isolating device according to claim 2, further comprising a member to be connected to the vibration generating part, wherein the member is placed on the inner member and joined together by a fastening member which is inserted from a concave part formed in the cylindrical part, and the inner member has a fastening portion which allows the fastening member to be connected thereto, and wherein the fastening portion faces the concave part and is arranged in a position offset toward the front side opening.

19. The vibration isolating device according to claim 3, further comprising a member to be connected to the vibration generating part, wherein the member is placed on the inner member and joined together by a fastening member which is inserted from a concave part formed in the cylindrical part, and the inner member has a fastening portion which allows the fastening member to be connected thereto, and wherein the fastening portion faces the concave part and is arranged in a position offset toward the front side opening.

* * * * *